United States Patent
Fujii (10) Patent No.: US 7,038,145 B2
(45) Date of Patent: May 2, 2006

(54) COMBINATIONAL WEIGHING APPARATUS WITH SIDE MOUNTED ARTICLE SUPPLY MEMBERS

(75) Inventor: Masaya Fujii, Ritto (JP)

(73) Assignee: Ishida Co., Ltd., Kyoto (JP)

( * ) Notice: Subject to any disclaimer, the term of this patent is extended or adjusted under 35 U.S.C. 154(b) by 240 days.

(21) Appl. No.: 10/469,008

(22) PCT Filed: Jan. 17, 2003

(86) PCT No.: PCT/JP03/00386

§ 371 (c)(1),
(2), (4) Date: Aug. 26, 2003

(87) PCT Pub. No.: WO03/062764

PCT Pub. Date: Jul. 31, 2003

(65) Prior Publication Data

US 2004/0238229 A1 Dec. 2, 2004

(30) Foreign Application Priority Data

Jan. 21, 2002 (JP) .................... 2002-011117

(51) Int. Cl.
*G01G 19/387* (2006.01)

(52) U.S. Cl. ............. 177/25.18; 177/58; 177/105; 177/109; 177/145; 198/348; 198/358

(58) Field of Classification Search ........ 177/25.18, 177/105, 119, 145, 58; 198/348, 358
See application file for complete search history.

(56) References Cited

U.S. PATENT DOCUMENTS

| 4,421,185 | A | * | 12/1983 | Koto et al. | ...... 177/25.18 |
|---|---|---|---|---|---|
| 4,549,272 | A | * | 10/1985 | Hagan et al. | ...... 198/358 |
| 4,662,508 | A | * | 5/1987 | Inoue et al. | ...... 198/601 |
| 4,673,046 | A | | 6/1987 | Matsuura | |
| 4,821,820 | A | * | 4/1989 | Edwards et al. | ...... 177/25.18 |
| 5,178,227 | A | * | 1/1993 | Kvisgaard et al. | ...... 177/145 |
| 6,235,998 | B1 | * | 5/2001 | Brewer | ...... 177/103 |
| 6,417,464 | B1 | * | 7/2002 | Steele | ...... 177/105 |
| 6,437,256 | B1 | * | 8/2002 | Miyamoto | ...... 177/25.18 |
| 6,683,261 | B1 | * | 1/2004 | Murata et al. | ...... 177/25.18 |
| 6,787,712 | B1 | * | 9/2004 | Asai et al. | ...... 177/25.18 |
| 6,881,907 | B1 | * | 4/2005 | Winkelmolen | ...... 177/145 |
| 2004/0173387 | A1 | * | 9/2004 | Criscione, II et al. | |

FOREIGN PATENT DOCUMENTS

| JP | 59-141018 A1 | 8/1984 |
|---|---|---|
| JP | 62-175624 A1 | 8/1987 |

* cited by examiner

*Primary Examiner*—Randy W. Gibson
(74) *Attorney, Agent, or Firm*—Shinjyu Global IP Counselors, LLP (57) ABSTRACT

The present invention provides a combination weighing apparatus that can rapidly supply articles to the weighing units side by rapidly supplying articles to a plurality of supply units. Combination weighing apparatus (1) is provided with a plurality of weigh hoppers (71), a conveyor (2), and a plurality of individual supply apparatuses (3). The weigh hoppers (71) measure the weight of the articles. The conveyor (2) is arranged alone the plurality of weigh hoppers (71), and conveys articles. An individual supply apparatus (3) is provided for each of the plurality of weigh hoppers (71), and supplies articles conveyed by the conveyor (2) to the weigh hooper (71).

10 Claims, 6 Drawing Sheets

COMBINATIONAL WEIGHING APPARATUS WITH SIDE MOUNTED ARTICLE SUPPLY MEMBERS

TECHNICAL FIELD OF THE INVENTION

The present invention relates to a combination weighing apparatus.

RELATED ART

Combination weighing apparatuses are in wide use, wherein an aggregate of articles, in which the aggregate is of a predetermined weight, is obtained by supplying articles to a plurality of weighing units and combining the weights of the articles supplied to each weighing unit. In addition to such combination weighing apparatuses, there are also those provided with a feeder apparatus that automatically supplies articles to each weighing unit. For example, Japanese Patent Application Kokai No. 2001-50802 proposes a combination weighing apparatus that supplies articles to a plurality of pool hoppers by laterally moving a conveyor that conveys the articles and dropping them into the pool hoppers. In addition, Japanese Patent No. 3203297 proposes a feeder apparatus that rotates a distribution trough in a horizontal plane, and drops articles onto a plurality of linear feeders disposed along an arc, thereby feeding articles to a weighing unit provided in each linear feeder.

To improve weighing performance in a combination weighing apparatus provided with a feeder apparatus that automatically supplies articles to a plurality of weighing units, the articles must be fed rapidly to the weighing units. However, the previously mentioned combination weighing apparatuses and feeder apparatuses are provided with a plurality of feeder units that supply articles to a plurality of weighing units, and articles are supplied to the feeder units by the movement of the feeder apparatus itself to the vicinity of the feeder unit that is demanding articles. Consequently, in these apparatuses, the movement to the vicinity of the feeder units takes time, making it difficult to rapidly supply articles.

DISCLOSURE OF THE INVENTION

The problem to be solved by the present invention is to provide a combination weighing apparatus that can rapidly supply articles to the weighing units side by rapidly feeding articles to a plurality of feeder units.

The combination weighing apparatus according to a first aspect includes a plurality of weighing units, a conveying means, and a plurality of individual supply apparatuses. Each weighing unit measures the weight of articles. A conveying means is arranged along the plurality of weighing units, and conveys articles. An individual supply apparatus is provided for each of the plurality of weighing units, and supplies articles conveyed by the conveying means to the weighing units side.

In the present combination weighing apparatus, articles are conveyed by a conveying means arranged along the plurality of weighing units. In other words, it is the articles that move, and each of the individual supply apparatuses supplies the moving articles to the weighing units side. Consequently, the present combination weighing apparatus can supply articles to the weighing units side faster than conventional weighing apparatuses, wherein articles are supplied by moving the feeder apparatus itself.

The combination weighing apparatus according to a second aspect is the combination weighing apparatus according to the first aspect, wherein the individual supply apparatus includes an article supply member. This article supply member supplies conveyed articles from the conveying means to the weighing units side by blocking a conveying path of the conveying means.

Because the present combination weighing apparatus can supply articles from the conveying means to the weighing units side by the simple operation of the article supply member blocking the conveying path, articles can be rapidly supplied to the weighing unit side.

The combination weighing apparatus according to a third aspect is the combination weighing apparatus according to the second aspect, wherein the article supply member is curved concavely with respect to the upstream side of the conveying path.

Because the article supply member of the present combination weighing apparatus is curved concavely with respect to the upstream side of the conveying path, articles are temporarily stored by the curved portion, and then subsequently supplied to the weighing units side. Consequently, there is leeway in the interval of time until the articles are supplied to the weighing units. Thereby, it is easier to adjust the quantity of articles supplied to the weighing units side compared with cases in which articles are supplied immediately to the weighing units side.

The combination weighing apparatus according to a fourth aspect is the combination weighing apparatus according to the second or third, wherein the individual supply apparatus further includes a switching means. This switching means switches between a first state wherein the conveying path is blocked by the rotation of the article supply member from the weighing units side of the conveying path to above the conveying path, and a second state wherein the article supply member returns to the weighing units side by rotating to the weighing units side of the conveying path.

In the present combination weighing apparatus, the article supply member in the first state blocks the conveying path by rotating from the weighing units side to above the conveying path. When the route of the articles conveyed via the conveying path is blocked by the article supply member, the articles move along the article supply member and are supplied to the weighing units side. In addition, in the second state, the article supply member returns to the weighing units side by rotating to the weighing units side of the conveying path, thereby departing from the position that blocks the conveying path. In this manner, the switching means of the combination weighing apparatus can adjust the quantity of articles supplied to the weighing units side by switching the article supply member between the first state and the second state. Furthermore, if the article supply member were to block the conveying path from the side opposite the weighing units side, there would be a risk of impeding the conveyance of articles on the conveying path when the article supply member returned to the side opposite the weighing units side after having supplied articles to the weighing units side. However, in the present combination weighing apparatus, the conveying path is blocked by the rotation of the article supply member from the weighing units side. Consequently, when the article supply member returns to the weighing units side, it returns while articles continue to be supplied to the weighing units side. Thereby, there is little risk of impeding the conveyance of articles compared with the case wherein the article supply member blocks the conveying path from the side opposite the weighing units side.

Furthermore, the ability of the article supply member to push articles onto the weighing units side by the operation of returning to the weighing units side improves the reliability with which articles are supplied to the weighing units side.

In addition, if the article supply member rotates from the upstream side to the downstream side of the conveying means in the first state, the rotating article supply member ends up pushing articles away in the conveying direction. Consequently, there is a reduced risk that the rotating article supply member will impede the conveyance of articles by going against the conveyance flow.

The combination weighing apparatus according to a fifth aspect is the combination weighing apparatus according to a fourth aspect, wherein the conveying means includes a wall-shaped guide arranged in the vicinity of the side opposite the weighing units side of the conveying path and that guides conveyed articles. Further, this guide is provided spaced apart by a predetermined spacing from the article supply member in the first state.

The article supply member in the first state blocks the conveying path by rotating from the weighing units side of the conveying path to above the conveying means. In addition, the wall-shaped guide that guides conveyed articles is arranged on the side opposite the weighing units side of the conveying path. Consequently, articles may be interposed between the guide and the article supply member in the first state. However, because the guide in the present combination weighing apparatus is provided spaced apart by a predetermined spacing from the article supply member in the first state, if the predetermined spacing is set appropriately there is virtually no risk of damaging the articles even if the articles are interposed between the guide and the article supply member in the first state.

The combination weighing apparatus according to a sixth aspect is the combination weighing apparatus according to the fifth aspect, wherein the guide includes an inclined part. This inclined part is inclined with respect to the conveying path so that the guide approaches the weighing units side of the conveying path.

The article supply member in the first state blocks the conveying path by rotating from the weighing units side of the conveying path to above the conveying means side. Consequently, if articles are conveyed to a position on the side opposite the weighing units side of the conveying path where the article supply member does not reach, the article supply member cannot supply these articles to the weighing units side.

In contrast, in the present combination weighing apparatus, the guide arranged on the side opposite the weighing units side of the conveying path has an inclined part that is inclined with respect to the conveying path so that the guide approaches the weighing units side. Consequently, if articles conveyed to a position on the side opposite the weighing units side of the conveying path where the article supply member does not reach come into contact with this inclined part, they will be moved to the weighing units side by the force of from this contacted portion and the force from the conveying means. Thereby, the articles conveyed to a position where the article supply member does not reach are moved to a position that the article supply member does reach, thus improving the reliability with which articles are supplied to the weighing units side.

The combination weighing apparatus according to a seventh aspect is the combination weighing apparatus according to any one of the fourth to sixth aspects, wherein the tip of each article supply member is arranged so that, in the second state, it is spaced apart by a predetermined spacing from the adjacent article supply member.

Because the present combination weighing apparatus has a plurality of article supply members, there are cases in which articles are interposed between the tip of an article supply member in the second state and the adjacent article supply member.

However, in the present combination weighing apparatus, because the tip of each article supply member is arranged so that, in the second state, it is spaced apart by a predetermined spacing from the adjacent article supply member, there is practically no risk of damaging the interposed articles if the predetermined spacing is set appropriately.

The combination weighing apparatus according to an eighth aspect is the combination weighing apparatus according to any one of the fourth to seventh aspects, wherein the individual supply apparatus further includes a sensor. This sensor detects articles held on the conveying path by the article supply member in the first state. The present combination weighing apparatus further includes a control unit that controls the switching means based on a signal from the sensor.

The control unit of the present combination weighing apparatus controls the switching means based on a signal from the sensor. For example, if articles are supplied to the weighing unit side by a certain article supply member, that article supply member can switch to the second state and interrupt the supply of articles to the weighing units side in order to prevent an excessive supply of articles to the weighing units side. In particular, even if articles are abnormally conveyed, it is possible to adjust accurately the quantity of articles supplied to the weighing units side by the detection of those articles by the sensor. Consequently, even if articles are abnormally conveyed to a certain extent, the present combination weighing apparatus can still perform the weighing operation with good accuracy. Furthermore, because the sensor detects articles held by the article supply member, articles supplied to the weighing units side by the article supply member can be reliably detected.

The combination weighing apparatus according to a ninth aspect is the combination weighing apparatus according to the eighth aspect, wherein the control unit performs control so that each individual supply apparatus takes longer time in which the article supply member is in the first state than the individual supply apparatus arranged upstream therefrom.

When the individual supply apparatus arranged upstream on the conveying means supplies articles to the weighing units side, the quantity of articles conveyed downstream is reduced, which tends to lead to fewer articles being supplied to the weighing units side by the individual supply apparatus arranged downstream on the conveying means. This causes a bias in the supply of articles to the weighing unit, which reduces the number of combinations of weighing units, leading to combination failures, thereby lowering the operating ratio of the combination weighing apparatus.

In contrast, the control unit of the present combination weighing apparatus performs control so that each individual supply apparatus takes longer time in which the article supply member is in the first state than the individual supply apparatus arranged upstream therefrom. Consequently, the individual supply apparatus located downstream on the conveying path increases the quantity of articles supplied to the weighing units side. Thereby, the individual supply apparatuses, from upstream to downstream on the conveying means, can generally supply articles uniformly to the weighing units side, and can prevent a reduction in the operating ratio of the combination weighing apparatus.

The combination weighing apparatus according to a tenth aspect is the combination weighing apparatus according to any one the first to seventh aspects, further has a control unit that operates individual supply apparatuses at predetermined time intervals.

Because the control unit in the present combination weighing apparatus operates the individual supply apparatuses at predetermined time intervals, the quantity of articles supplied to the weighing units side can be easily controlled in the case where articles are conveyed normally. For example, by lengthening the time that articles are supplied to a weighing unit by a certain individual supply apparatus, the quantity of articles supplied to the weighing units side by that individual supply apparatus can be increased. Thereby, even if the weight value of the articles weighed by the present combination weighing apparatus changes, this can be easily handled by changing the time that articles are supplied to the weighing unit by the individual supply apparatus.

The combination weighing apparatus according to an eleventh aspect is the combination weighing apparatus according to any one of the first to tenth aspects, wherein a plurality of weighing units is arrayed linearly. The present combination weighing apparatus is further provided with a circulating means that returns articles that have been conveyed to the downstream side of the conveying path without being supplied to the weighing units side back to the upstream side of the conveying path.

To avoid wasting any articles not supplied to the weighing units side by the individual supply apparatus arranged most downstream on the conveying means if the weighing units are arranged linearly, those articles should be returned to the upstream side of the conveying means. However, if this operation were performed manually by an operator, the burden on the operator would increase significantly. Because the present combination weighing apparatus is provided with the circulating means, the circulating means returns to the upstream side of the conveying means those articles not supplied to the weighing unit side and conveyed to the downstream side of the conveying means. Consequently, the burden on the operator can be reduced.

PREFERRED EMBODIMENT

Constitution of the Combination Weighing Apparatus 1

Figure 1:
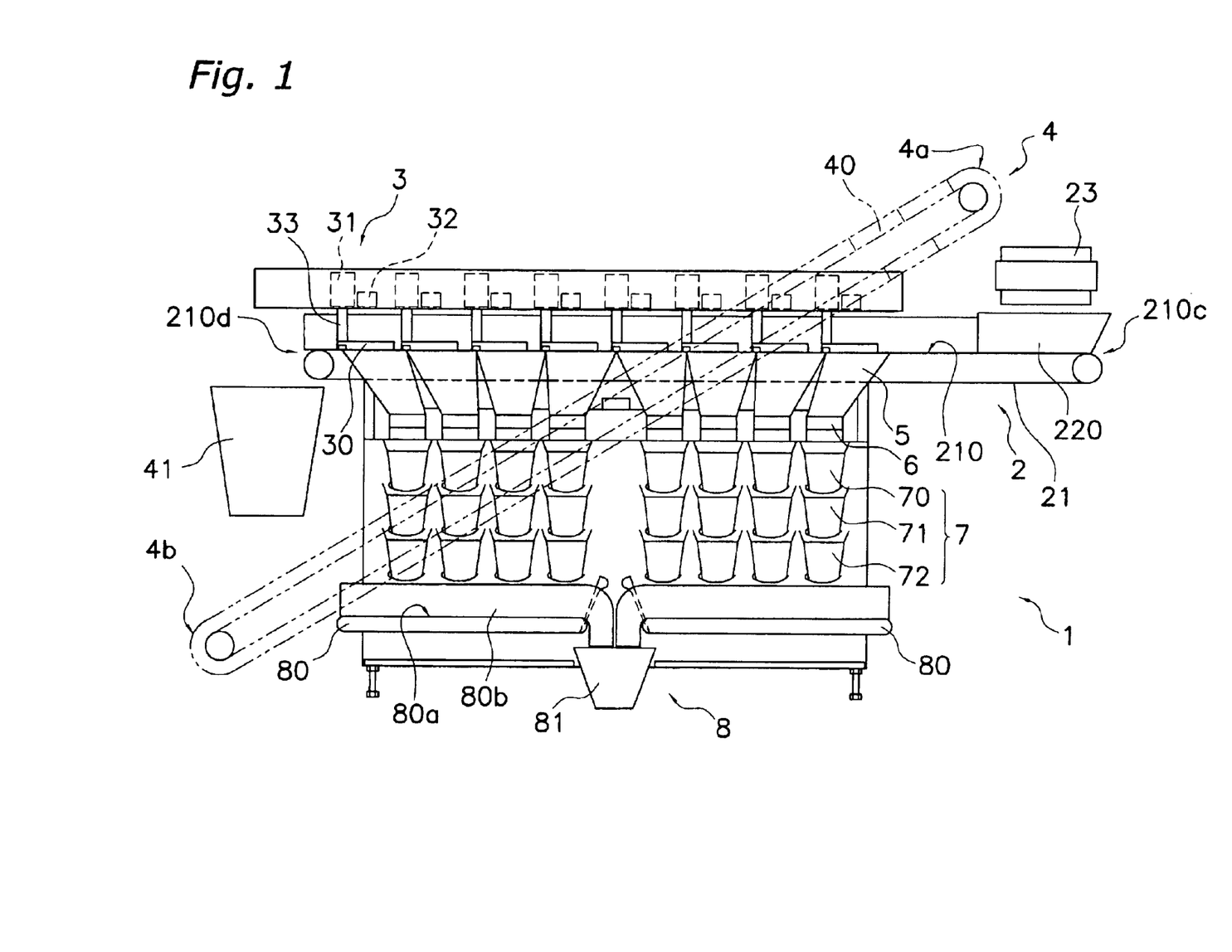
FIG. 1 is a front view of a combination weighing apparatus in accordance with a preferred embodiment of the present invention.
Figure 2:
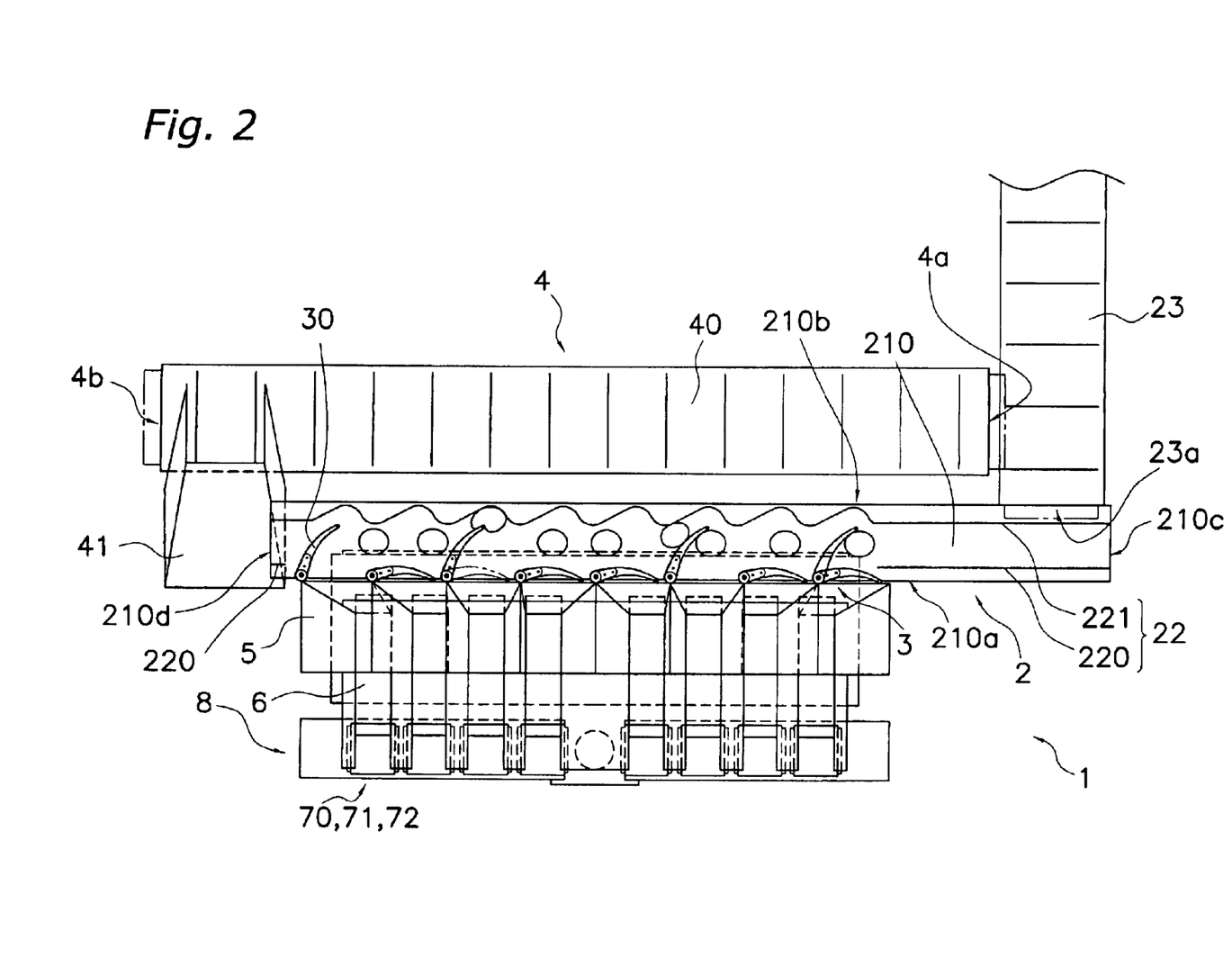
FIG. 2 is a plan view of the combination weighing apparatus.
Figure 3:
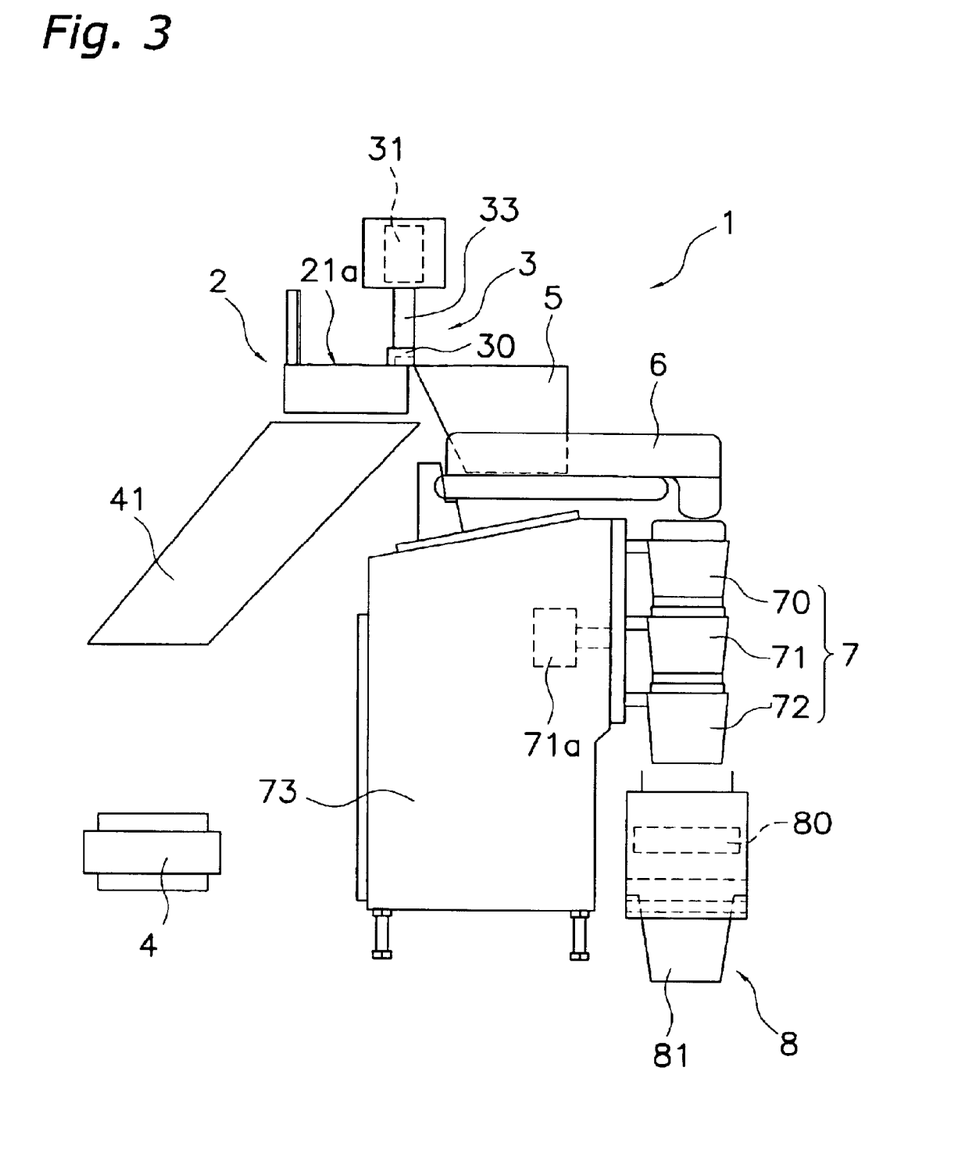
FIG. 3 is a left-side view of the combination weighing apparatus.

FIGS. 1, 2, and 3 show the combination weighing apparatus 1 according to one embodiment of the present invention. FIGS. 1, 2, and 3 are a front view, plan view, and left-side view of the combination weighing apparatus 1, respectively. The combination weighing apparatus 1 is a weighing apparatus that automatically sorts articles fed therein to a plurality of weigh hoppers and booster hoppers, selects hoppers so that the sum of their weight values amounts to a target value, and then collects and discharges an aggregate of articles, each aggregate having a predetermined weight. The combination weighing apparatus 1 includes a conveyor 2, an individual supply apparatus 3, a circulating conveyor 4, an individual chute 5, a supply feeder 6, a hopper 7, an article collection apparatus 8, and a control unit 9 (refer to FIG. 6).

In the present combination weighing apparatus, four heads each are arranged linearly on the left and right sides thereof, each head having a pool hopper 70, a weigh hopper 71, and a booster hopper 72, as shown in FIG. 1. Each head is provided with an individual chute 5, and a supply feeder 6, through which articles are fed to each head.

<Individual Chute 5>

Four individual chutes 5 each are arranged linearly on the left and right sides of the combination weighing apparatus, corresponding to each of the heads. The top side and bottom side of each individual chute 5 are open; articles fed in from the top side are guided downwards, and articles are discharged from the opening at the lower part.

<Supply Feeder 6>

The supply feeder 6 has an electromagnetic vibrating apparatus and an inclined trough. The supply feeder 6 is arranged so that the rear part of the inclined trough is positioned below the opening in the bottom side of the individual chute 5. The supply feeder 6 vibrates the articles fed in from the individual chute 5 to the rear part of the inclined trough, and supplies the articles to the pool hopper 70 by moving the articles to the tip of the inclined trough and dropping them from the tip.

<Hoppers 7>

The hoppers 7 include a pool hopper 70, a weigh hopper 71, and a booster hopper 72.

The pool hopper 70 is arranged below the tip of the supply feeder 6, and temporarily stores articles supplied from the supply feeder 6. The pool hopper 70 supplies articles to the weigh hopper 71 by discharging articles from the lower part of the pool hopper 70.

The weigh hopper 71 is arranged directly below the pool hopper 70, and receives and weighs the articles discharged from the pool hopper 70.

The booster hopper 72 is arranged directly below the weigh hopper 71, and temporarily stores articles discharged from the weigh hopper 71. The articles stored in the booster hopper 72 participate in the combination calculation together with the articles in the weigh hopper 71.

The pool hopper 70, the weigh hopper 71, and the booster hopper 72 generally have the same structure. Each hopper 7 has: a cylindrical main body, formed from a synthetic resin, and linked vertically to one another, and a gate, freely openable and closable, attached to the underside of the main body. Each hopper 7 can store articles in the hopper main body when the gate is closed, and discharges the stored articles downward when the gate is opened.

In addition, the weigh hopper 71 is provided with a load cell 71a in a drive box 73, as shown in FIG. 3. The load cell 71a measures the weight of the articles in the weigh hopper 71, and transmits that measurement value to the control unit 9 (refer to FIG. 6).

<Article Collection Apparatus 8>

The article collection apparatus 8 principally has a discharge conveyor 80 and a collection and discharge chute 81.

Two discharge conveyors 80 are provided, arranged respectively below the right-side and left-side booster hoppers 72. The discharge conveyor 80 is a belt conveyor having a belt 80a, and horizontally conveys articles discharged from the booster hoppers 72 and then transfers the articles to the collection and discharge chute 81. In addition, a guide plate 80b is provided on both sides of the discharge conveyor 80 to guide conveyed articles.

The collection and discharge chute 81 is provided between the left and right discharge conveyors 80, and guides articles dropped from the tip of the inside of the discharge conveyor 80 downwards and discharges the articles from the opening at the lower part.

The constitution from the individual chute 5 to the article collection apparatus 8 was explained above; however, in the combination weighing apparatus 1, the supply of articles to the individual chutes 5 is performed automatically by the conveyor 2, the individual supply apparatuses 3, and the circulating conveyor 4. The following explains the constitution of each of these apparatuses.

<Conveyor 2>

The conveyor 2 is a belt conveyor having a belt 21, and horizontally conveys articles fed onto the upstream side of the conveyor 2. The conveyor 2 is arranged along and rearward of the linearly arranged eight individual chutes 5 (refer to FIG. 2). The articles fed onto the conveyor 2 are conveyed on a conveying surface 210 on the top side of the belt 21. The conveying surface 210 of the conveyor 2 is arranged at generally the same height as the opening at the top side of the individual chute 5. Furthermore, as shown in FIG. 2, the articles are conveyed from the right to the left on the conveying surface 210. In other words, in FIG. 2, the right side of the conveyor 2 is the upstream side, and the left side is the downstream side.

A wall-shaped conveyor guide 22, which guides conveyed articles and sets up on the conveying surface 210, is provided along the conveying direction in the vicinity of side edge parts 210a, 210b of the conveying surface 210 of the conveyor 2. Conveyor guides 220 are provided in the vicinity of the side edge part 210a (hereinafter, the "front-side edge part 210a") on the individual chute 5 side of the conveying surface 210, one each at the upstream side and downstream side of the conveying surface 210, and are arranged at portions where article supply members 30, discussed later, are not arranged. A conveyor guide 221 in the vicinity of the side edge part 210b (hereinafter, the "rear-side edge part 210b") on the side opposite the individual chute 5 side of the conveying surface 210 is provided continuously from the upstream side to the downstream side of the conveyor 2.

Furthermore, an infeed conveyor 23 is arranged orthogonally to the conveyor 2, and the downstream edge part 23a of the infeed conveyor 23 is positioned above the vicinity of the upstream edge part 210c of the conveyor 2.

<Individual Supply Apparatus 3>

The individual supply apparatus 3 is provided for each of the eight linearly arrayed weigh hoppers 71, and is arranged in the vicinity of the individual chute 5 corresponding to each weigh hopper 71. The individual supply apparatus 3 is an apparatus that supplies articles conveyed on the conveying surface 210 by the conveyor 2 to the front-side edge part 210a of the conveying surface 210, drops the articles from the front-side edge part 210a, and thereby supplies the articles to the individual chute 5. The individual supply apparatus 3 principally has an article supply member 30, a motor 31, and a sensor 32 (refer to FIG. 1).

Figure 4:
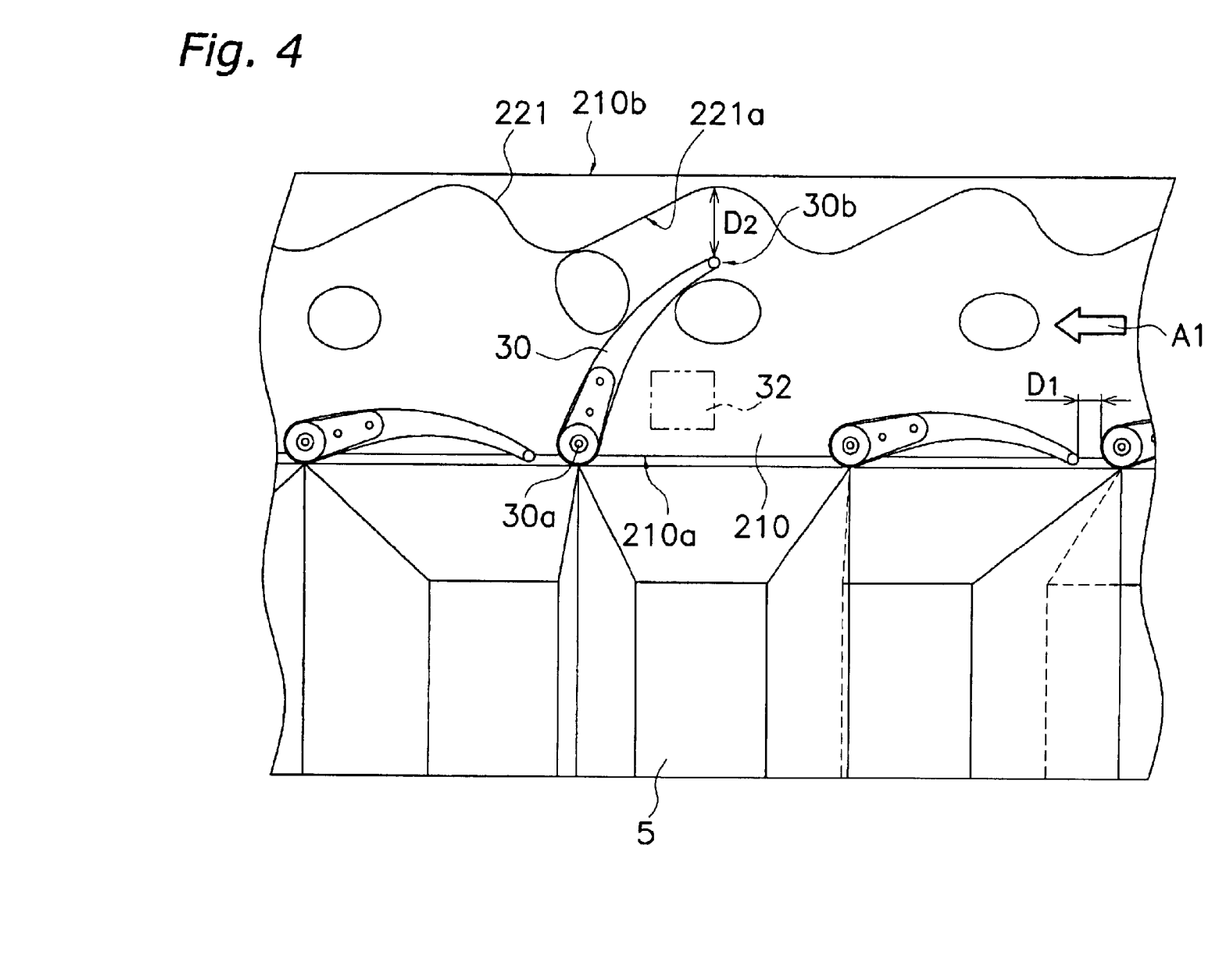
FIG. 4 is an enlarged view of a conveying surface of a conveyor of the combination weighing apparatus.

The article supply member 30 is arranged freely rotatable on the conveying surface 210. As shown in FIG. 4, the center of rotation 30a of the article supply member 30 is arranged adjacent to the opening in the top side of the individual chute 5 in the vicinity of the front-side edge part 210a of the conveying surface 210. The article supply member 30 is a curved, tapered member concave with respect to the upstream side of the conveying surface 210. Furthermore, the outline arrow A1 in FIG. 4 indicates the direction in which the articles are conveyed.

As shown in FIG. 1, the motor 31 is provided above the article supply member 30, and is connected to the center of rotation 30a of the article supply member 30 via a drive shaft 33. The motor 31 rotates the article supply member 30, and switches it between the first state and the second state. Herein, the first state is the state wherein, as shown by the solid line in FIG. 5(a), the article supply member 30 rotates from the state generally along the front-side edge part 210a of the conveying surface 210 toward the rear-side edge part 210b of the conveying surface 210, thereby blocking the region above the conveying surface 210. When in the first state, the article supply member 30 is inclined toward the upstream direction of the conveyor 2. In addition, the second state is the state wherein, as shown in the solid line in FIG. 5(b), the article supply member 30 blocking the region above the conveying surface 210 rotates toward the front-side edge part 210a of the conveying surface 210, and returns to the state generally along the front-side edge part 210a. In this second state, the tip 30b of the article supply member 30 is oriented in the upstream direction of the conveyor 2. As shown in FIG. 4, the tip 30b of the article supply member 30 is arranged in the second state so that it is spaced apart by a predetermined spacing D1 from the adjacent article supply member 30.

Figure 5A:
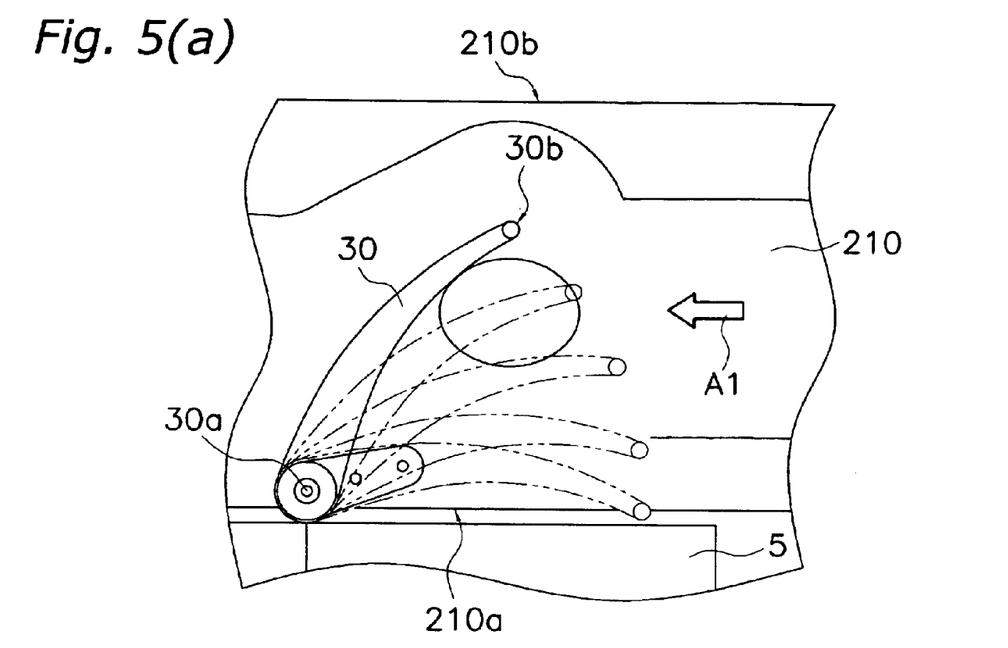
FIG. 5(a) is a view of an article supply member of the combination weighing apparatus in a first state.
Figure 5B:
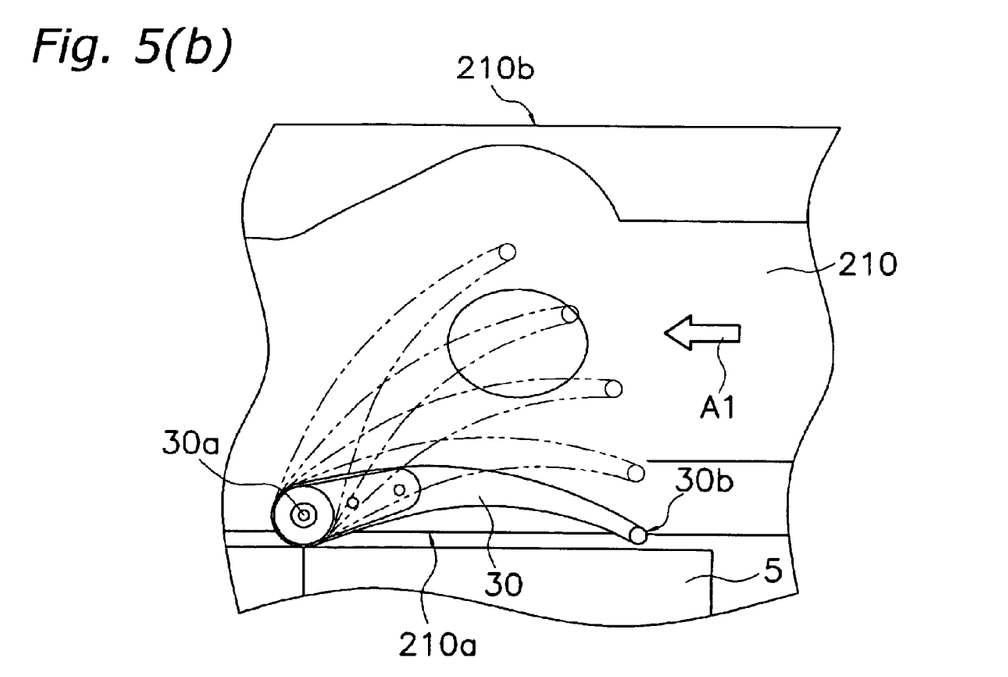
FIG. 5(b) is a view of the article supply member in a second state.

Furthermore, the broken chain lines in FIGS. 5(a) and 5(b) indicate the trajectory of the article supply member.

In addition, the previously mentioned conveyor guide 221 is provided, as shown in FIG. 4, spaced apart by a predetermined spacing D2 from the article supply member 30 in the first state. The predetermined spacing D2 is a spacing sufficient so that the conveyed articles are not damaged if they are interposed between the article supply member 30 in the first state and the conveyor guide 221, and is determined by factors such as the softness, size, and shape of the conveyed articles.

Furthermore, the conveyor guide 221 has an inclined part 221a that is inclined with respect to the conveying surface 210 so that conveyor guide 221 approaches the front-side edge part 210a side of the conveying surface 210. The inclined part 221a juts out toward the front-side edge part 210a side to the position where the tips 30b of the article supply members 30 in the first state line up, and is arranged so that the portion of the inclined part 221a that is closest to the front-side edge part 210a faces opposite the vicinity of the center of rotation 30a of the article supply member 30. In addition, the portion of the inclined part 221a that is farthest from the front-side edge part 210a is arranged so that it faces opposite the vicinity of the tip 30b of the article supply member 30 in the first state. The inclined part 221a is provided for each article supply member 30, and the inclined parts 221a are smoothly continuous.

The sensor 32 detects the articles held on the conveying surface 210 by the article supply member 30 in the first state. The sensor 32 is arranged above the space interposed between the article supply member 30 in the first state and the front-side edge part 210a of the conveying surface 210. The sensor 32 sends the information detected to the control unit 9.

Furthermore, to facilitate understanding of the arrangement of the various apparatuses on the conveying surface, the apparatuses above the article supply member 30 are omitted in FIG. 2.

<Circulating Conveyor 4>

The circulating conveyor 4 is a belt conveyor having a belt 40, is arranged rearward of the conveyor 2, and is inclined from the downstream side upward toward the upstream side of the conveyor 2 (refer to FIGS. 1 and 2). The circulating conveyor 4 transfers articles from the downstream side toward the upstream side of the conveyor 2. A recovery chute 41 is provided between the vicinity of a downstream edge part 210d of the conveyor 2 and the vicinity of an upstream edge part 4b of the circulating conveyor 4. The top side and bottom side of the recovery chute 41 are open, the opening at the top side of the recovery chute 41 is provided below the downstream edge part 210d of the conveyor 2, and the opening at the bottom side of the recovery chute 41 is provided above the upstream side of the circulating conveyor 4. The recovery chute 41 guides downwards the articles dropped from the downstream edge part 210d of the conveyor 2, and discharges the articles to the upstream side of the circulating conveyor 4. A downstream edge part 4a of the circulating conveyor 4 is positioned above the infeed conveyor 23.

<Control Unit 9>

Figure 6:
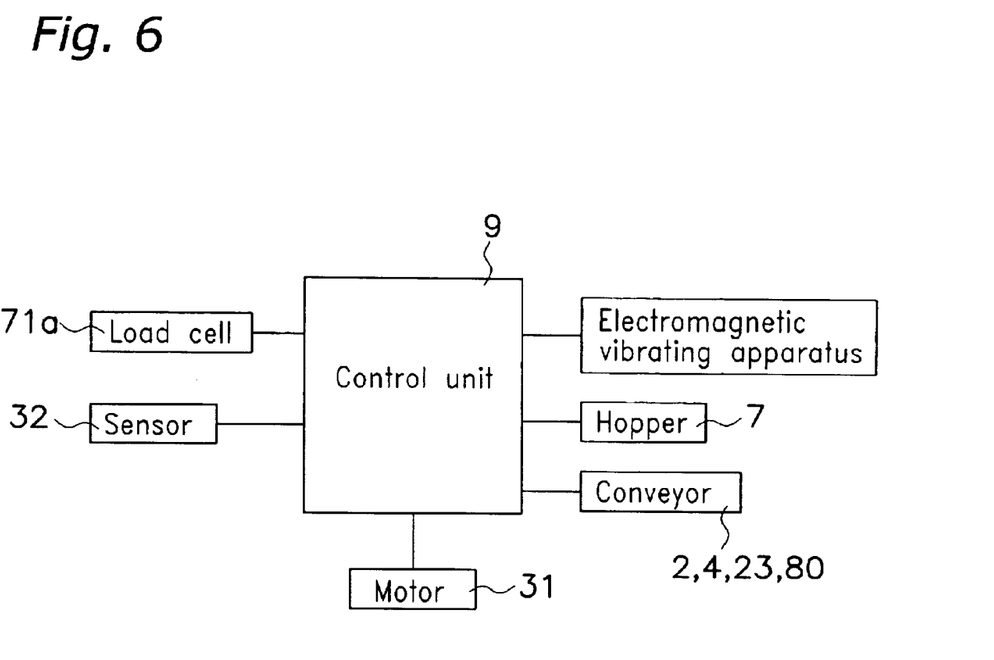
FIG. 6 is a view of a block diagram of a control unit of the combination weighing apparatus.

The control unit 9 includes a CPU, ROM, RAM, HDD, and the like, and, as shown in FIG. 6, is connected to the load cells 71a, the sensors 32, the motors 31, the conveyors 2, 4, 23, 80, the hoppers 7, the electromagnetic vibrating apparatuses, and the like. The control unit 9 performs a combination calculation based on the weight data from the load cells 71a, and controls the operation of each connected constituent part.

Operation of Combination Weighing Apparatus 1

The combination weighing apparatus 1 automatically sorts the infed articles to each of the heads, performs a combination calculation, and discharges the weighed articles. The following explains the operation of the combination weighing apparatus 1.

<Operation from Infeeding of Articles to Supplying of Articles to the Individual Chute 5>

An operator loads articles onto the infeed conveyor 23 (refer to FIG. 2). The articles are transferred to the downstream side of the infeed conveyor 23, and dropped from the downstream edge part 23a to the vicinity of the upstream edge part 210c of the conveyor 2.

The articles fed into the conveyor 2 are conveyed on the conveying surface 210 of the conveyor 2. At this time, among the plurality of individual supply apparatuses 3 arranged above the conveying surface 210, the article supply member 30 of the individual supply apparatus 3 that is demanding the supply of articles is in the first state, and the other article supply members 30 are in the second state (refer to FIG. 4). Because the article supply members 30 in the second state are along the front-side edge part 210a, the conveyed articles are not held by these article supply members 30. In addition, because the paths to the openings of the individual chutes 5 are closed in the second state by the article supply members 30, articles are not fed into these individual chutes 5. Consequently, the articles pass by the article supply members 30 in the second state. Because the article supply member 30 in the first state blocks the region above the conveying surface 210, the conveyed articles are held by this article supply member 30. In addition, because the path to the individual chute 5 is open when the article supply member 30 is in the first state, the held articles move along the article supply member 30 by the force received from the conveying surface 210, and are fed into the individual chute 5 from the front-side edge part 210a of the conveying surface 210. At this time, because the article supply member 30 is curved concavely with respect to the upstream side of the conveyor 2, the articles that move along the article supply member 30 in the first state are temporarily held by the curved portion, and then supplied to the individual chute 5. Consequently, there is extra time before articles are supplied to the individual chute 5. Thereby, it is easy to adjust the quantity of articles supplied to the individual chute 5 compared with the case wherein articles are supplied immediately to the individual chute 5.

The articles held by the article supply member 30 move along the article supply member 30, and pass through the space interposed between the article supply member 30 in the first state and the front-side edge part 210a of the conveying surface 210. The articles traverse directly below the sensor 32, and the sensor 32 detects the articles held by the article supply member 30 and sends the information detected to the control unit 9. At this time, because the articles are temporarily held by the curved portion of the article supply member 30, as previously mentioned, it is easier for the sensor 32 to detect articles than in the case in which articles are rapidly supplied. Consequently, the accuracy with which the sensor detects articles is improved.

The control unit 9 controls the motor 31 based on the signal from the sensor 32. If the control unit 9 judges that articles of a predetermined count have been supplied to the individual chute 5, it switches the article supply member 30 to the second state by driving the motor 31 to rotate the article supply member 30. The articles held by the article supply member 30 either move along the article supply member 30 by the force received from the conveying surface 210, or are pushed to the article supply member 30, which switches to the second state, dropping the articles from the front-side edge part 210a of the conveying surface 210, and feeding the articles into the individual chute 5. Simultaneously, the path to the individual chute 5 is obstructed by the article supply member 30 in the second state and, subsequently, the articles are no longer supplied to the individual chute 5.

Furthermore, the control unit 9 performs a control so that each individual supply apparatus 3 takes longer time in which the article supply member 30 is in the first state than the individual supply apparatus 3 arranged upstream therefrom.

Articles that were not held by the article supply member 30 and that passed by all article supply members 30, drop from the downstream edge part 210d of the conveyor 2 and are fed into the recovery chute 41 (refer to FIG. 2). The articles fed into the recovery chute 41 drop to the vicinity of the upstream edge part 4b of the circulating conveyor 4, and are transferred to the circulating conveyor 4. The transferred articles drop from the downstream edge part 4a of the circulating conveyor 4, are fed midway onto the infeed conveyor 23, and are fed again onto the conveyor 2.

<Operation from Feeding Articles Into the Individual Chute 5 Until Weighing and Collecting the Articles>

The articles fed into the individual chute 5 are fed into the supply feeder 6 and then supplied from the supply feeder 6 to the corresponding pool hopper 70 (refer to FIG. 1).

In cases where articles are not present in the weigh hopper 71 below the pool hopper 70, the gate of the pool hopper 70 opens and articles are discharged to the weigh hopper 71. The weight of the articles supplied to the weigh hopper 71 is detected by the load cell 71a, and the weight value is stored in the control unit 9.

In cases where articles are not present in the booster hopper 72 below the weigh hopper 71, the gate of the weigh hopper 71 opens after the weight is detected, and the articles are discharged into the booster hopper 72. In this manner, whenever the weigh hopper 71 becomes empty, articles are supplied into the weigh hopper 71 from the pool hopper 70. The weight of these articles is likewise detected by the load cell 71a, and the weight value is stored in the control unit 9. In other words, the control unit 9 stores the weight value of the articles presently in the booster hopper 72 that were previously weighed, and the weight value of the articles presently in the weigh hopper 71 that were presently weighed.

This type of operation is performed for each head having the pool hopper 70, the weigh hopper 71, and a booster hopper 72. Furthermore, every time the weigh hopper 71 and booster hopper 72 discharge articles and new articles are supplied, the measurement value data stored for each hopper 7 is updated.

Furthermore, the control unit 9 performs a combination calculation, based on the measurement value data of the articles in the weigh hoppers 71 and the booster hoppers 72, seeking a combination wherein the total weight approaches the preset target weight. In other words, the control unit 9 selects, from among the eight horizontally-arrayed columns of weigh hoppers 71 and booster hoppers 72, a number of hoppers that constitute the optimal combination so that the combined weight of the collected articles matches the target weight or approaches the target weight within an allowable range.

However, to select the measurement data of the articles presently in the weigh hopper 71, the measurement data of the booster hopper 72 below that weigh hopper 71 must also be selected. In addition, within the allowable range in the combination calculation, the booster hopper 72 located below is given higher priority than the weigh hopper 71 located above.

If a combination of hoppers 71, 72 is selected, the gates of the corresponding hoppers 71, 72 open, and the articles from those hoppers 71, 72 are discharged onto the discharge conveyor 80. In cases where the combination includes only booster hoppers 72, articles are supplied to the emptied booster hoppers 72 from the weigh hoppers 71. In addition, if the combination includes a weigh hopper 71, the articles in the weigh hopper 71 are discharged together with the articles in the booster hopper 72 therebelow.

Subsequently, new articles are supplied from the pool hopper 70 to the weigh hopper 71, weighed in the weigh hopper 71, and then supplied to the booster hopper 72.

When the pool hopper 70 becomes empty, the control unit 9 requests the supply of articles to the individual supply apparatus 3 corresponding to the emptied pool hopper 70. In other words, the control unit 9 drives the motor 31 of the individual supply apparatus 3, which rotates the article supply member 30, thereby switching it to the first state. Furthermore, the articles are fed into the individual chute 5 again, and supplied to the pool hopper 70 via the supply feeder 6.

The articles discharged from the combination-selected booster hoppers 72 onto the discharge conveyor 80 are transferred to the collection and discharge chute 81 by the discharge conveyor 80, and are discharged from the lower part of the collection and discharge chute 81.

<Characteristics of the Combination Weighing Apparatus 1>

(1) In the present combination weighing apparatus 1, articles are conveyed along the individual chute 5 by the conveyor 2, and are supplied to the individual chute 5 by that individual supply apparatus 3 that, among the individual supply apparatuses 3—one each provided for each individual chute 5—, demanded the supply of articles. In the past, in cases where the supply apparatus itself moved to the vicinity of the individual chute 5 and then supplied articles, every time there was a demand for supply the supply apparatus would move, and articles would be supplied from the supply apparatus after it arrived in the vicinity of the individual chute 5. Consequently, from the moment of the demand for supply until articles were supplied, the supply apparatus itself needed time to move. However, in the present combination weighing apparatus 1, articles are conveyed sequentially by conveyor 2; when there is a demand for supply, articles are fed into the individual chute 5 merely by rotating the article supply member 30. Consequently, in the present combination weighing apparatus 1, articles can be supplied to the individual chute 5 more rapidly than the case wherein the supply apparatus itself moves. Thereby, the present combination weighing apparatus 1 can supply articles with a good response time with respect to the demand for the supply of articles from the hoppers 7.

(2) In the case where an operator works on a production line and manufactured articles are successively fed into a weighing apparatus, the processing speed of the weighing apparatus sometimes cannot keep up with the production speed if the latter is too fast. In a conventional weighing apparatus, the infeed of articles becomes excessive at such times, making it necessary to stop the production line. However, in the present combination weighing apparatus 1, even if the infeed of articles becomes excessive, the excess articles not weighed can easily be discharged from the weighing apparatus. In other words, because articles not supplied to the individual chute 5 by the individual supply apparatus 3 reach the downstream side of the conveyor 2 as is, the articles are discharged from the recovery chute 41 if the circulating conveyor 4 is disconnected. Consequently, if the quantity of articles fed into the present combination weighing apparatus 1 becomes excessive, there is no need to stop the production line.

(3) In cases where the article supply member 30 in the first state blocks the conveying surface 210 of the conveyor 2 from the rear-side edge part 210b of the conveying surface 210, there is a risk of impeding the conveyance of articles on the conveying surface 210 when the article supply member 30 returns to the rear-side edge part 210b after supplying articles to the individual chute 5. For example, consider the cases in which the articles on the conveying surface 210 unfortunately are moved in the direction of the rear-side edge part 210b, or are unfortunately interposed between the article supply member 30 returning to the rear-side edge part 210b and the conveyor guide 221. However, in the present combination weighing apparatus 1, the conveying surface 210 is blocked by rotating the article supply member 30 from the front-side edge part 210a adjacent to the individual chute 5. Consequently, when the article supply member 30 returns to the front-side edge part 210a, it can do so while continuing to supply articles to the individual chute 5. Thereby, there is less risk of impeding the conveyance of articles compared with the case wherein the article supply member 30 blocks the region above the conveying surface 210 from the rear-side edge part 210b. In addition, by rotating, the article supply member 30 can open and close the path to the individual chute 5. Namely, the path to the individual chute 5 is opened in the first state, and the path to the individual chute 5 is closed in the second state. Consequently, it is possible to control a mistaken supply of conveyed articles to the individual chute 5, which improves the accuracy of the supply of articles. In addition, because articles can be pushed into the individual chute 5 by the action of the article supply member 30 returning to the front-side edge part 210a, the reliability of supplying articles to the individual chute 5 is improved. Furthermore, when switching to the first state, the rotating article supply member 30 pushes articles outward in the conveying direction. Consequently, there is even less risk of the rotating article supply member 30 opposing the conveyance flow and impeding the conveyance of articles.

(4) The article supply member 30 in the first state blocks the conveying surface 210 by rotating from the front-side edge part 210a of the conveying surface 210 to above the conveying surface 210. In addition, the wall-shaped conveyor guide 22 that guides the conveyed articles is arranged at the rear-side edge part 210b of the conveying surface 210. Consequently, conveyed articles may become interposed between the article supply member 30 in the first state and the conveyor guide 221. However, because the conveyor guide 221 in the present combination weighing apparatus 1 is provided spaced apart by the predetermined spacing D2 from the article supply member 30 in the first state, damage to the articles can be reduced even if the articles are interposed between the article supply member 30 in the first state and the conveyor guide 221.

Furthermore, if the conveyor guide 221 is provided spaced apart by the predetermined spacing D2 from the article supply member 30 in the first state, there is a risk that articles will be conveyed to a position where the article supply member 30 does not reach. For example, consider the case in which articles interposed between the article supply member 30 in the first state and the conveyor guide 221 are released when the article supply member 30 switches to the second state, and are once again conveyed on the conveying surface. In this case, the articles are conveyed in the vicinity between the conveyor guide 221 and the article supply member 30 in the first state. If articles are conveyed to this position, the article supply member 30 cannot reach the articles and cannot supply them to the individual chute 5.

However, in the present combination weighing apparatus 1, the conveyor guide 221 has the inclined part 221a that is inclined with respect to the conveying surface 210 so that the conveyor guide 221 approaches the front-side edge part 210a. Consequently, if the articles conveyed to a position that the article supply member 30 cannot reach come into contact with the inclined part 221a, the articles move in the direction approaching the front-side edge part 210a, namely toward a position that the article supply member 30 can reach, by the force received from the portion contacted and the force received from the conveying surface 210. Thereby, the articles conveyed to a position that the article supply member 30 cannot reach can be moved to a position that the article supply member 30 can reach, and the quantity of conveyed articles that unfortunately pass by the article supply member 30 in the first state can be reduced. Thereby, the reliability with which the article supply member 30 supplies articles to the individual chute 5 is improved.

(5) In the present combination weighing apparatus 1, a plurality of article supply members 30 is arranged adjacent to one another; in the second state, an article supply member is in a state generally along the front-side edge part 210a of the conveying surface 210. Consequently, articles may become interposed between the tip 30b of the article supply member 30 in the second state and the adjacent article supply member 30. However, in the present combination weighing apparatus 1, the tip 30b of each article supply member 30 is arranged so that, in the second state, it is spaced apart by the predetermined spacing D1 from the adjacent article supply member 30. It is therefore possible to reduce damage to the interposed articles.

(6) In the present combination weighing apparatus 1, the control unit 9 controls the motors 31 based on the signals received from the sensors 32. Accordingly, even if articles are abnormally conveyed, articles held by the article supply member 30 are detected by the sensor 32, and the quantity of articles supplied to the individual chute 5 can thereby be accurately adjusted. Consequently, in the present combination weighing apparatus 1, the articles can be weighed with good accuracy even if articles are conveyed abnormally to some extent.

(7) If an individual supply apparatus 3 arranged on the upstream side of the conveyor 2 supplies articles to an individual chute 5, the quantity of articles conveyed to the downstream side of the conveyor 2 is reduced. Consequently, the quantity of articles supplied to the individual chutes 5 by the individual supply apparatuses 3 arranged on the downstream side of the conveyor 2 tends to lessen. This creates a bias in the supply of articles to the individual chutes 5. This also creates a bias in the hoppers 7 supplied with articles. In such a case, the number of combinations of hoppers 7 is reduced, leading to combination failures, and thereby reducing the operating ratio of the combination weighing apparatus 1.

However, in the present combination weighing apparatus 1, the control unit 9 performs control so that each individual supply apparatus 3 takes longer time in which the article supply member 30 is in the first state than the individual supply apparatus 3 arranged upstream side of the conveyor 2 therefrom. Consequently, bias in the quantity of articles supplied to the individual chutes 5 can be suppressed by increasing the quantity of articles conveyed to the individual chutes 5 by the individual supply apparatuses 3 located on the downstream side of the conveyor 2. Thereby, the article supply members 30, from the upstream side to the downstream side of the conveyor 2, can generally supply articles uniformly to the individual chutes 5. In other words, the hoppers 7 supplied with articles also become generally uniform. Consequently; it is possible to curb the decline in the operating ratio of the combination weighing apparatus 1 due to the generation of combination failures caused by a reduction in the number of combinations.

(8) In the present combination weighing apparatus 1, the circulating conveyor 4 returns articles that arrive at the downstream side of the conveyor 2 once again to the upstream side of the conveyor 2. Consequently, the articles not supplied to an individual chute 5 and conveyed to the downstream side of the conveyor 2 can be automatically returned to the upstream side of the conveyor 2. The burden on the operator is thereby reduced.

OTHER EMBODIMENTS

In the present combination weighing apparatus 1 discussed above, the heads are arranged linearly; however, they may also be arranged circularly. In this case, it is preferable that the conveyor 2 is circular and arranged along the heads. Furthermore, if using a circular conveyor, there is no need to provide the circulating conveyor 4 because the conveyed articles are re-circulated on the conveyor 2. Thereby, the burden on the operator is lightened.

In addition, we can consider a case in which the control unit 9 performs a control by operating the individual supply apparatuses 3 at predetermined time intervals. In cases where articles are conveyed abnormally, the quantity of articles supplied to the individual chute 5 can be easily controlled by controlling the predetermined time interval. For example, by lengthening the time in which the article supply member 30 of a certain individual supply apparatus 3 is in the first state, the quantity of articles supplied to the individual chute 5 by that individual supply apparatus 3 can be increased. Thereby, even if the weight value of the articles weighed Out by the combination weighing apparatus 1 is changed, this can be easily handled by changing the amount of time that articles are supplied to the individual chute 5 by the individual supply apparatus 3.

INDUSTRIAL APPLICABILITY

The use of the present invention enables articles to be more rapidly supplied to the weighing units side compared with the case wherein the supply apparatus itself moves in order to supply articles.

What is claimed is:

1. A combination weighing apparatus, comprising:
   a plurality of weighing units that measure the weight of articles;
   conveying means arranged along said plurality of weighing units, and that conveys the articles;
   a plurality of chutes, one each provided for each of said plurality of weighing units, said plurality of chutes being linearly arranged on a side along said conveying means; and
   a plurality of individual supply apparatuses, one each provided for each of at least some of said plurality of weighing units, said individual supply apparatuses supplying the articles conveyed by said conveying means toward said weighing units via said chutes,
   wherein at least one of said individual supply apparatuses has an article supply member that is arranged on said chutes side of said conveying means and leads the conveyed article to move from a conveying path of said conveying means to said chutes side toward one of said chutes by blocking said conveying path from said chutes side.

2. The combination weighing apparatus comprising:
   a plurality of weighing units that measure the weight of articles;
   conveying means arranged along said plurality of weighing units, and that conveys the articles; and
   a plurality of individual supply apparatuses, one each provided for each of at least some of said plurality of weighing units, said individual supply apparatuses supplying the articles conveyed by said conveying means toward said weighing units.
   wherein
   at least one of said individual supply apparatuses has an article supply member that supplies the conveyed article from said conveying means toward said weighing units by blocking a conveying path of said conveying means, and
   said article supply member is curved concavely with respect to an upstream side of said conveying path.

3. The combination weighing apparatus according to claim 1, wherein
   at least one of said individual supply apparatuses further has switching means that switches between a first state wherein its article supply member blocks said conveying path, with said article supply member being rotated from said chutes side of said conveying path to above said conveying path, and a second state wherein its article supply member does not block said conveying path, with said article supply member being rotated from above said conveying path to said chutes side of said conveying path.

4. The combination weighing apparatus according to claim 3, wherein
   said conveying means has a wall-shaped guide arranged adjacent to a side of said conveying path opposite said chutes side, said wall-shaped guide guiding articles to be conveyed; and
   said guide is provided spaced apart by a predetermined spacing from said article supply member in said first state.

5. The combination weighing apparatus according to claim 4, wherein
   said guide has an inclined part that is inclined with respect to said conveying path so that said guide approaches said chutes side of said conveying path.

6. The combination weighing apparatus according to claim 3, wherein
   each of said individual supply apparatuses has an article supply member, and
   a tip of each of said article supply members is, while in said second state, arranged so that the tip is spaced apart by a predetermined spacing from adjacent one of said article supply members.

7. The combination weighing apparatus according to claim 3, wherein
   said article supply member further has
   a sensor that detects articles held on said conveying path by said article supply member that is in said first state; and
   a control unit that controls said switching means based on a signal from said sensor.

8. The combination weighing apparatus according to claim 7, wherein
   said control unit performs control so that the time during which said article supply member is in said first state for at least one of said individual supply apparatuses is longer than that of at least one of said individual supply apparatuses that are arranged upstream therefrom.

9. The combination weighing apparatus according to claim 1, further comprising:
   a control unit that operates said plurality of individual supply apparatuses at predetermined time intervals.

10. The combination weighing apparatus according to claim 1, wherein
    said plurality of weighing units is linearly arranged; and
    a circulating means is further provided for returning to an upstream side of said conveying path said articles that are conveyed to a downstream side of said conveying path without being supplied to said chutes side of said conveying path.

* * * * *